United States Patent
Andres et al.

[15] 3,694,028
[45] Sept. 26, 1972

[54] ANCHORING ARRANGEMENT OF A SAFETY BELT IN A MOTOR VEHICLE

[72] Inventors: Rudolf Andres, Sindelfingen; Guntram Huber, Dachtel, Wurttemberg, both of Germany

[73] Assignee: Daimler-Benz Aktiengesellschaft, Stuttgart-Untertuerkhem, Germany

[22] Filed: Dec. 4, 1970

[21] Appl. No.: 95,136

[30] Foreign Application Priority Data

Dec. 6, 1969 Germany..........P 19 61 381.1

[52] U.S. Cl. .................................297/386, 188/1 C
[51] Int. Cl. ..............................................A62b 35/60
[58] Field of Search ....................297/386; 288/1 C

[56] References Cited

UNITED STATES PATENTS

| | | |
|---|---|---|
| 3,106,989 | 10/1963 | Fuchs ...................297/386 X |
| 3,550,955 | 12/1970 | Nicholas................297/385 X |
| 3,198,288 | 8/1965 | Presunka..................297/386 |
| 3,280,942 | 10/1966 | Millington .............297/386 X |
| 3,232,383 | 2/1966 | Moberg.....................297/386 |
| 3,482,872 | 12/1969 | Chamberlain.............297/386 |

FOREIGN PATENTS OR APPLICATIONS 905,836   9/1962   Great Britain.............188/1 C

*Primary Examiner*—James T. McCall
*Attorney*—Craig, Antonelli, Stewart & Hill

[57] ABSTRACT

A fastening arrangement for a safety belt in a motor vehicle in which the place of fastening of the safety belt is so constructed that it yields, beginning with a predetermined tensional force at the safety belt, while producing at the same time deformation work.

21 Claims, 4 Drawing Figures

PATENTED SEP 26 1972 3,694,028
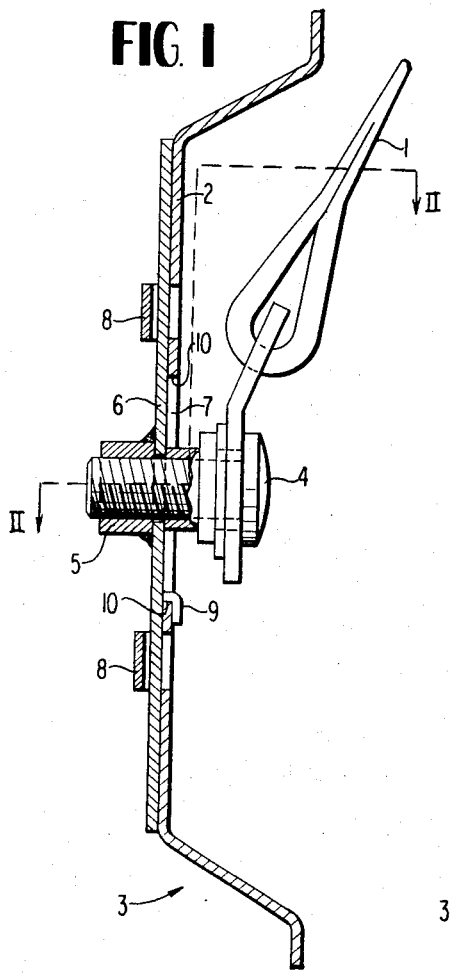
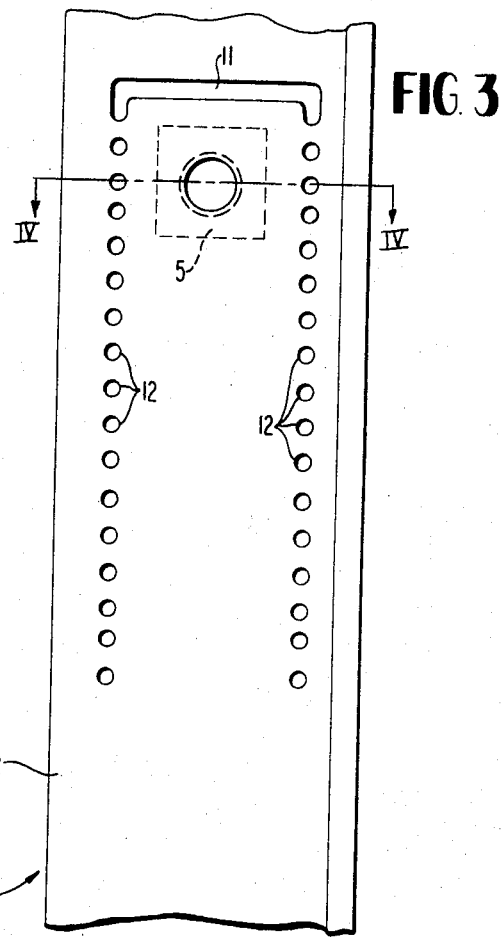
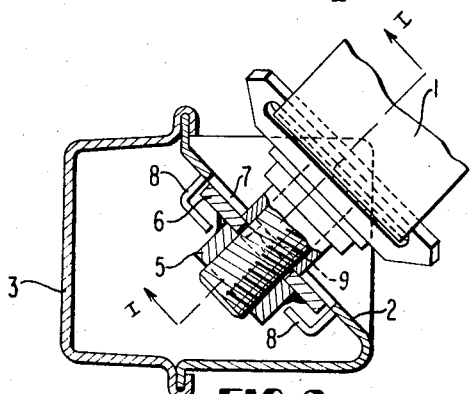
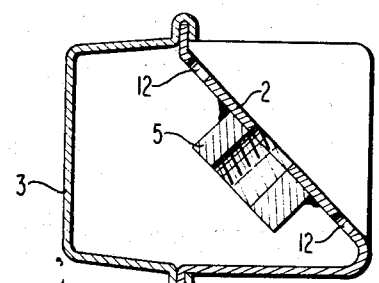
INVENTORS
RUDOLF ANDRES
GUNTRAM HUBER
BY Craig, Antonelli, Stewart & Hill
ATTORNEYS

ANCHORING ARRANGEMENT OF A SAFETY BELT IN A MOTOR VEHICLE

The present invention relates to the fastening of a safety belt in a motor vehicle.

The force of a safety belt acting on the human body during a strong deceleration should not exceed a predetermined amount. For the limitation of the belt force, different installations have therefore become known in the prior art, which all entail the disadvantage that they are relatively expensive or project as rigid structure into the passenger space of a motor vehicle within the area of the safety belt anchoring place.

The present invention is concerned with the task to achieve a limitation of the belt force, on the one hand, with simple means and, on the other, by means which do not project in any manner into the interior of the vehicle.

The underlying problems are solved according to the present invention in that the fastening or anchoring place of the safety belt itself is so constructed that beginning with a predetermined tensional force at the safety belt it yields with the production of a form-change work.

In an advantageous embodiment of the subject matter of the present invention, the construction may be made in such a manner with a fastening, in which one end of the safety belt is retained by means of a screw or bolt at a fastening or anchoring eye secured in a wall, that a part of the wall provided with the fastening eye is constructed bendable out of the plane of the wall beginning with a predetermined tensional force at the safety belt. The part of the wall provided with the fastening eye may thereby consist of a separate sheet metal strip that is arranged at the wall behind a cut-out, opening or the like in such a manner that the bolt or screw inserted into the securing eye projects through the cut-out or the like and the sheet metal strip bends-through beginning with a predetermined tensional force while supporting itself at the edges of the cut-out or the like and can be pulled with its center portion through the cut-out or the like. A force is necessary in an advantageous manner for pulling through the sheet metal strip through the cut-out or the like which is nearly constant since the sheet metal strip is deformed uniformly over its entire length.

The cut-out or the like may consist of a rectangular opening whose width is larger than the width of the sheet metal strip.

Retaining tabs or the like may be provided at the wall and/or at the sheet metal strip for retaining the sheet metal strip in its initial position which tabs can be bent during the bending of the sheet metal strip.

In order to achieve as uniformly large as possible a friction value between the sheet metal strip and the edge of the cut-out or the like, the edges of the cut-out may be lined or coasted with synthetic resinous parts.

Instead of the arrangement of a sheet metal strip, the construction of the inventive subject matter may, however, also be made in such a manner that the part of the wall provided with the fastening eye is constructed so as to be torn out of this wall.

This part of the wall can be constructed strip-shaped, and the securing eye may be arranged at one end of this strip-shaped part. Furthermore, this part may be delimited on three sides by a perforation or the like so that the tearing direction is predetermined.

Accordingly, it is an object of the present invention to provide a fastening means for a safety belt in a motor vehicle which avoids by simple means the aforementioned shortcomings and drawbacks encountered in the prior art.

Another object of the present invention resides in an anchoring arrangement for the safety belt of a motor vehicle that limits the belt force to a predetermined amount, yet is simple in construction and requires no parts projecting into the interior of the vehicle.

Still another object of the present invention resides in a mounting of the safety belt of a motor vehicle which limits the amount of force to be exerted by the belt on the human body by simple means while at the same time producing deformation work due to change in shape which dissipates energy.

These and further objects, features, and advantages of the present invention will become more obvious from the following description when taken in connection with the accompanying drawing which shows, for purposes of illustration only, two embodiments in accordance with the present invention, and wherein:

FIG. 1 is a partial longitudinal cross-sectional view along section I—I of FIG. 2 through a box-like column of a vehicle with a fastening or anchoring place for a safety belt according to the present invention;

FIG. 2 is a cross-sectional view through section II—II of FIG. 1;

FIG. 3 is an elevational view of a wall of a box-like column of a vehicle with a fastening or anchoring place for a safety belt according to a second embodiment of the present invention; and FIG. 4 is a cross-sectional view through section IV—IV of FIG. 3.

Referring now to the drawing wherein like reference numerals are used throughout the various views to designate like parts, and more particularly to FIGS. 1 and 2, one end of the safety belt 1 is secured or anchored in this embodiment at a wall 2 of a box-like vehicle column generally designated by reference numeral 3 by means of a securing bolt or screw 4 which is screwed into a fastening eye 5.

In order to limit the belt force, the arrangement is made in such a manner that the safety belt 1 is not secured directly at the wall 2 of the box-like vehicle column 3 but instead at a separate part of the wall that consists of a sheet metal strip 6. This sheet metal strip 6, provided with the fastening eye 5, suitably secured thereto, for example, by welding, is disposed behind the wall 2 whereby the securing bolt 4 for the safety belt 1 screwed into the securing eye 5, projects through the rectangular cut-out 7. The width of the cut-out 7 is slightly larger than the width of the sheet metal strip 6. The sheet metal strip 6 is held by tabs 8 pressed out of the wall 2 and by the tab 9 arranged at the sheet metal strip 6.

The dimensions of the sheet metal strip 6 and the distance of the lower edge 10 of the cut-out 7 from the upper edge 10 are so chosen that upon exceeding a predetermined belt force the sheet metal strip 6 is pulled through the aperture 7. The sheet metal strip 6 thereby supports itself at the edges 10 which may possibly be lined with synthetic resinous material parts, and deforms itself V-shaped while producing a deformation work, i.e., work due to the change in form.

In the embodiment according to FIGS. 3 and 4, the securing eye 5 is arranged directly at the wall 2 of the box-like vehicle column 3. A slot 11 is provided in the wall 2 closely above the securing eye 5 and one row of bores 12 each extends on each side of the slot 11 in the downward direction. A strip-shaped part is delimited in the wall 2 by the slot 11 and the bores 12, at one end of which engages the belt force and at the other end of which exists an unweakened connection to the other parts of the wall 2.

If the belt force exceeds a predetermined amount, then the wall 2 tears along the bores 12 whereby this tearing starts from the slot 11.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What I claim is:

1. A fastening arrangement for fastening a safety belt to a fixed wall part of a motor vehicle comprising: an opening in said wall part, a securing strip positioned on one side of said wall part in overlapping relationship with at least two oppositely facing edges of said opening, holding means for holding said securing strip in position on said one side in such a manner that relatively free sliding movement of the respective abutting surfaces of said strip and said one side is permitted at least in the direction corresponding to movement of portions of said securing strip toward said opening, fastening eye means fixedly attached to said securing strip, and connecting means extending through said opening for rigidly connecting said fastening eye means to one end of said safety belt, said securing strip being constructed and dimensioned with respect to said opening so as to dissipate energy by plastic bending deformation as said strip is pulled through said opening upon the application of a large predetermined tensile force in said seat belt.

2. An arrangement according to claim 1, wherein said connecting means includes threaded means.

3. An arrangement according to claim 2, wherein said threaded means includes a bolt threadably engaged in a threaded recess of said fastening eye means.

4. An arrangement according to claim 2, wherein said opening is rectangular.

5. An arrangement according to claim 4, wherein said securing strip is rectangular and is narrower that the width of said opening and longer than the length of said opening, and wherein said securing strip is centered over said opening and is aligned with its longest dimension parallel with the longest dimension of the opening.

6. An arrangement according to claim 2, wherein the two oppositely facing edges of the opening over which the securing strip is pulled are lined with synthetic resinous material to reduce sliding friction.

7. An arrangement according to claim 2, wherein the holding means include tab means formed by partial cutouts of the respective wall part and securing strip.

8. An arrangement according to claim 3, wherein said bolt extends perpendicularly to the plane of said wall part through the center of the opening.

9. An arrangement according to claim 3, wherein said fastening eye means is constructed as an annular internally threaded boss welded to said securing strip at the side of said strip facing away from the opening.

10. An arrangement according to claim 1, wherein said wall part is recessed in the area of the opening whereby the fastening connection is precluded from protruding outwardly beyond the normal plane of the wall.

11. An arrangement according to claim 10, wherein said wall part is part of a box-like vehicle column.

12. A fastening arrangement for fastening a safety belt to a fixed wall part of a motor vehicle comprising: fastening eye means fixedly attached to said wall part, connecting means for rigidly connecting said fastening eye means to one end of said safety belt, and perforation means in said wall part arranged around the fastening eye means, said perforation means being so constructed as to permit a strip of the wall part delimited by said perforations to be torn and bent out of the plane of the wall part upon the application of a large predetermined tensile force at the safety belt, the tearing and bending of said strip causing the dissipation of energy and forces in said belt.

13. An arrangement according to claim 12, wherein the strip is rectangular in shape and is delimited along three sides by the perforation means.

14. An arrangement according to claim 13, wherein the perforation means includes an open slot along the full extent of a first side of said strip, said open slot being closely positioned and centered with respect to said fastening eye means.

15. An arrangement according to claim 14, wherein said perforation means further includes two parallel rows of spaced apertures extending from the end of said slot past the fastening means to a position substantially spaced from said fastening eye means, said rows forming second and third sides of said rectangular strip.

16. An arrangement according to claim 15, wherein the fourth side of said strip is formed as an uninterrupted portion of said wall extending between end apertures of said second and third sides, said fourth side being parallel to said open slot and being spaced further from said fastening eye means than said first side.

17. An arrangement according to claim 16, wherein the apertures are uniformly spaced circular apertures.

18. An arrangement according to claim 12, wherein said connecting means includes threaded means threadably engaging an opening in said fastening eye means.

19. An arrangement according to claim 16, wherein said connecting means includes threaded means threadably engaging an opening in said fastening eye means.

20. An arrangement according to claim 12, wherein said fastening eye means is connected to the side of said wall part facing away from said seat belt.

21. An arrangement according to claim 12, wherein said fastening eye means is welded to said wall part.

* * * * *